United States Patent
Medard et al.

(10) Patent No.: US 11,381,339 B2
(45) Date of Patent: Jul. 5, 2022

(54) SYSTEM AND TECHNIQUE FOR GENERATING, TRANSMITTING AND RECEIVING NETWORK CODED (NC) QUICK UDP INTERNET CONNECTIONS (QUIC) PACKETS

(71) Applicant: Code On Network Coding, LLC, Cambridge, MA (US)

(72) Inventors: Muriel Medard, Belmont, MA (US); László Viktor Jánoky, Érd (HU); Patrik János Braun, Iklad (HU)

(73) Assignee: Code On Network Coding, LLC, Cambridge, MA (US)

( * ) Notice: Subject to any disclaimer, the term of this patent is extended or adjusted under 35 U.S.C. 154(b) by 0 days.

(21) Appl. No.: 16/604,200

(22) PCT Filed: Nov. 6, 2018

(86) PCT No.: PCT/US2018/059340
§ 371 (c)(1),
(2) Date: Oct. 10, 2019

(87) PCT Pub. No.: WO2019/090289
PCT Pub. Date: May 9, 2019

(65) Prior Publication Data
US 2020/0067634 A1   Feb. 27, 2020

Related U.S. Application Data

(60) Provisional application No. 62/582,006, filed on Nov. 6, 2017.

(51) Int. Cl.
| H04L 1/00 | (2006.01) |
| H04L 1/16 | (2006.01) |
| H04L 1/18 | (2006.01) |
| H04L 65/65 | (2022.01) |

(52) U.S. Cl.
CPC .......... *H04L 1/0042* (2013.01); *H04L 1/0076* (2013.01); *H04L 1/1657* (2013.01); *H04L 1/187* (2013.01); *H04L 65/608* (2013.01)

(58) Field of Classification Search
CPC ... H04L 1/0042; H04L 1/0076; H04L 1/1657; H04L 1/187; H04L 1/0041; H04L 65/608; H04L 69/164
See application file for complete search history.

(56) References Cited

U.S. PATENT DOCUMENTS

| 9,026,783 B2 | 5/2015 | Roskind et al. |
| 9,319,329 B2 | 4/2016 | Roskind et al. |
| 9,338,088 B2 | 5/2016 | Roskind |
| 9,432,274 B1 | 8/2016 | Peon et al. |

(Continued)

OTHER PUBLICATIONS

PCT International Preliminary Report dated May 22, 2020 for International Application No. PCT/US2018/059340; 9 Pages.

(Continued)

*Primary Examiner* — Saumit Shah
(74) *Attorney, Agent, or Firm* — Daly, Crowley, Mofford & Durkee, LLP

(57) ABSTRACT

A method comprising reframing one or more QUIC frames into a packed frame; and applying network coding to the packed frame to generate a coded frame.

20 Claims, 14 Drawing Sheets

(56) References Cited

U.S. PATENT DOCUMENTS

| | | | |
|---|---|---|---|
| 2010/0246543 A1* | 9/2010 | Rajkotia | H04L 1/0083 370/338 |
| 2014/0059168 A1* | 2/2014 | Ponec | H04L 69/165 709/217 |
| 2017/0188203 A1* | 6/2017 | Goseling | H04W 28/065 |
| 2017/0279558 A1* | 9/2017 | Badr | H04L 1/0041 |

OTHER PUBLICATIONS

Cui et al., "Innovating Transport with QUIC: Design Approaches and Research Challenges;" IEEE Internet Computing, Institute of Electrical and Electronics Engineers, vol. 21, No. 1; Mar. 1, 2017; 5 Pages.

Garrido et al., "Exploiting Sparse Coding: A Sliding Window Enhancement of a Random Linear Network Coding Scheme;" IEEE International Conference on Communications (ICC); May 22, 2016; 6 Pages.

Pardue, "BBC R&D Detailed Technology Proposal for Reference Interface M;" Power-Point Presentation to DVB TM-IPI Taskforce on Adaptive Streaming Over IP Multicast; Oct. 31, 2017; 19 Pages.

Sorenson et al., "On Network Coded Filesystem Shim: Over-the-top Multipath Multi-Source Made Easy;" IEEE International Conference on Communications, SAC Symposium Cloud Communications and Networking Track; May 21, 2017; 7 Pages.

Sundararajan et al., "Network Coding Meets TCP;" Proceedings of the IEEE INFOCOM; Sep. 29, 2008; 9 Pages.

PCT International Search Report and Written Opinion dated May 10, 2019 for International Application No. PCT/US2018/059340; 15 Pages.

* cited by examiner

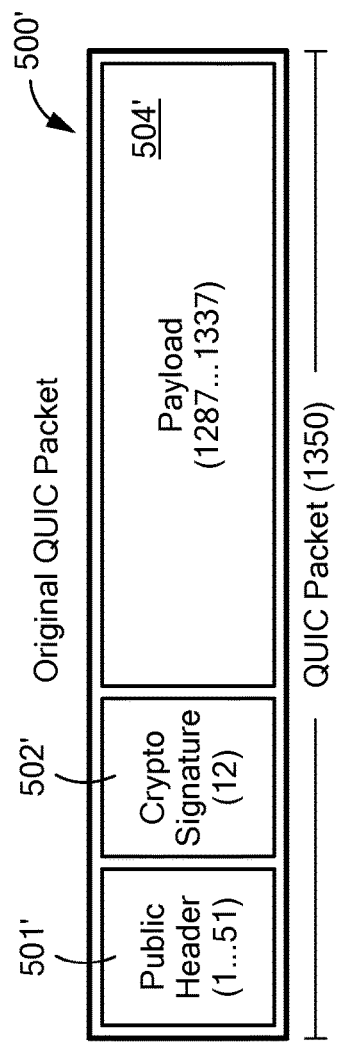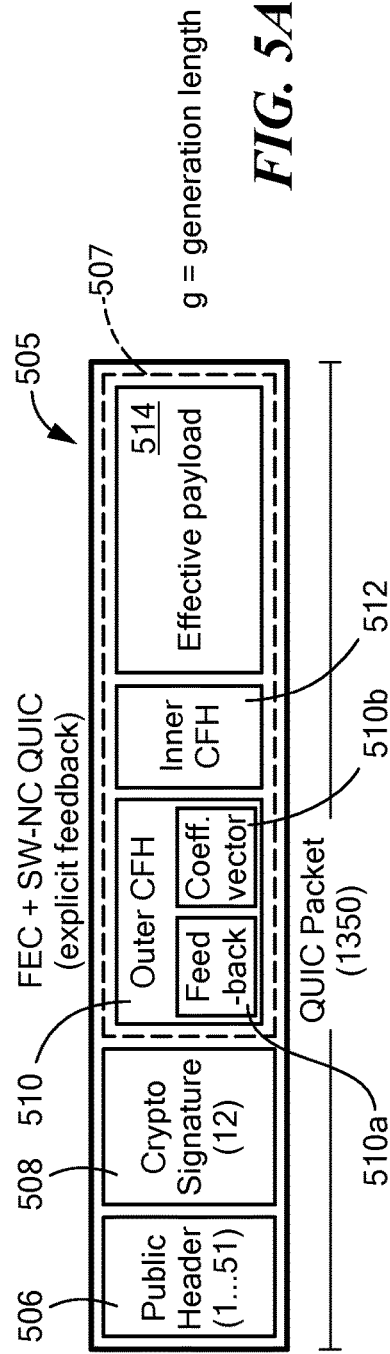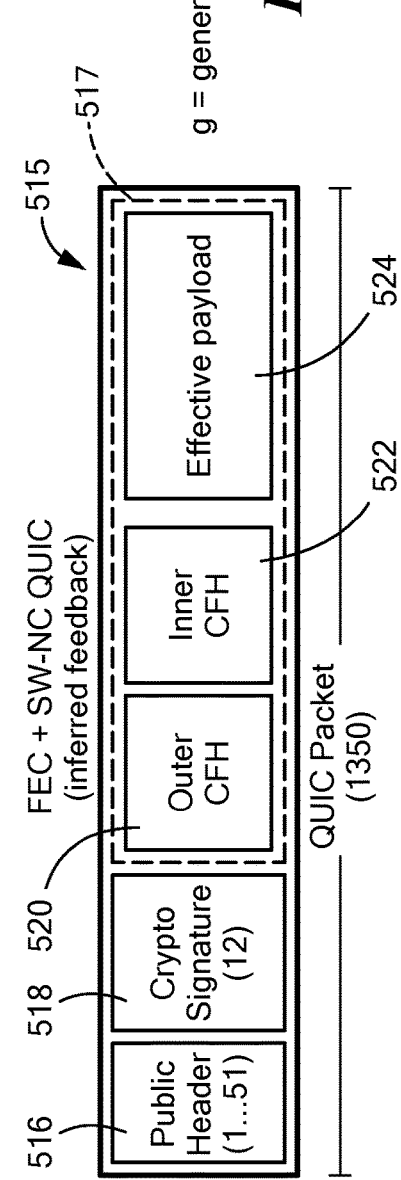

SYSTEM AND TECHNIQUE FOR GENERATING, TRANSMITTING AND RECEIVING NETWORK CODED (NC) QUICK UDP INTERNET CONNECTIONS (QUIC) PACKETS

CROSS REFERENCE TO RELATED APPLICATIONS

This patent application is a U.S. National Stage of PCT Application No. PCT/US2018/059340 filed in the English language on Nov. 6, 2018, and entitled "System And Technique For Generating, Transmitting And Receiving Network Coded (NC) Quick UDP Internet Connections (QUIC) Packets," which claims priority to and benefit of U.S. Provisional Patent Application No. 62/582,006 filed on Nov. 6, 2017, which are incorporated here by reference in their entireties.

BACKGROUND

As is known in the art, there exist protocols which provide a set of stream transports that traverse the internet. One such protocol is the Quick UDP Internet Connections (QUIC) which may be built atop UDP (User Datagram Protocol).

As is also known, attempts have been made to incorporate forward error correction (FEC) into the QUIC protocol. One QUIC FEC protocol utilizes a single XOR recovery packet approach built into the transport layer of a network. One problem with this approach, however, is that packet loss is highly correlated, so even when a loss occurs, a large percentage (in some cases on the order of 70%) of FEC packets recover nothing. For HTTP traffic, it has been found that the approach of simply re-sending the earliest outstanding packet (i.e. after a certain time period, the server retransmits the packet which wasn't acknowledged) provided superior performance to sending XOR FEC packets. Furthermore, integration into the network transport layer results in difficulties with making changes to the FEC. Thus, existing QUIC FEC approaches are insufficient for use with real time applications such as applications utilizing Web Real-Time Communication (WebRTC) protocols.

SUMMARY

Described herein are concepts, systems, devices and techniques directed toward a Network Coded (NC) Quick UDP Internet Connections (QUIC) protocol. Packets generated in accordance with such techniques are compatible with QUIC. This may be accomplished using either or a combination of two techniques to be described below. Also, the concepts, systems, devices and techniques described herein may be used with forward error correction (FEC) techniques and related devices and systems.

In a first technique, network coding is applied to already encrypted (or "sealed") QUIC packets. That is, an entire QUIC packet is encoded.

In a second technique, QUIC frames may be re-framed into so called "packed frames" and network coding is applied to the "packed frames" for generating so-called "coded frames," with each coded frame having a size corresponding to the payload of one QUIC packet.

In general overview, given multiple QUIC frames a new frame referred to as a coded frame is generated. That is, rather than putting such multiple frames into a QUIC packet in accordance with prior art techniques, a so-called coded frame is generated. The coded frame contains: the original QUIC frames concatenated and padded (for example zero padded) to a fixed size and encoded using a network coding codec; a number of bits representing an original length (before padding) in a coded frame header; and a coefficient vector (i.e. a vector including information representing the coding coefficients used in the network coding).

In embodiments, the coefficient vector may also be considered part of the coded frame header). In cases in which so-called explicit feedback may be used, then also included in the coded frame is the codec's feedback in a coded frame header. In cases in which so-called inferred feedback is used, the codec's feedback is not included in the coded frame header. A coded frame may or may not contain FEC data.

It is, of course, also possible to consider the coefficient vector as part of a trailer. Putting the coefficient vector in a trailer.

In embodiments, the codec's feedback is provided as metadata the decoder generates based upon what packets it was able to already decode. Based on this feedback, the encoder can close/shrink its window. In the inferred approach generate the codec's feedback be generated based upon the QUIC ACK-s.

The resulting coded frame may be the size of the maximal QUIC packet payload size. Thus, when the coded frame is included in a packet, no other QUIC frames will fit. This packet is provided to a QUIC processor (i.e. a processor capable of generating QUIC packets in accordance with the QUIC protocol), which will handle the so-structured packet having the coded frame like any other packet.

On the receiving side, in response to a client receiving a packet containing a coded frame, the coded frame is decoded using a network coding codec to thereby restore the original QUIC frames. The original QUIC frames are then passed for processing. If the frame cannot yet be decoded, the frame is buffered until it can be decoded.

In embodiments, when the frame cannot be decoded, the processing of the entire packet may be halted. In this case, QUIC won't send ACKs for the packet, which may possibly trigger a resend from the server.

On the other hand, if the frames are buffered but there is an acknowledgement receiving the packet, an unmodified QUIC implementation would try to process the following packets, potentially causing data to become reordered.

It should be appreciated that in embodiments operating in accordance with the concepts described herein, when a UDP packet having an encoded QUIC packet as a payload is received, it must first be decrypted. After decryption, it is possible to determine if the data can be decoded. If decoding cannot yet be accomplished, the unencrypted data (which is no longer a packet, but rather is a chunk of data) may be buffered.

Some concepts and techniques described herein may be implemented within QUIC (i.e. the techniques may be native to QUIC). Thus, such techniques are sometimes referred to herein as "inside" technique meaning that it is necessary to adapt or modify the existing QUIC protocol in order to implement such techniques. It should, however, also be appreciated that some concepts and techniques described herein may be implemented outside of QUIC (i.e. the techniques need not be native to QUIC). Thus, such techniques are sometimes referred to as "outside" techniques meaning that there is no need to change the QUIC protocol to utilize such techniques. It should be understood that the aforementioned inside and outside techniques may be used individually or in combination (i.e. an inside technique and an outside technique may be used on the same packet or sets of packets).

BRIEF DESCRIPTION OF THE DRAWINGS

The foregoing features may be more fully understood from the following description of the drawings in which:

FIG. 5 is block diagram of a conventional QUIC packet having a structure which may be (same as or similar to the conventional QUIC packet of FIG. 1A);

FIG. 5A is a block diagram of an encoded (or re-framed) QUIC packet having explicit feedback;

FIG. 5B is a block diagram of an encoded (or re-framed) QUIC packet having inferred feedback;

DETAILED DESCRIPTION

Figure 1:
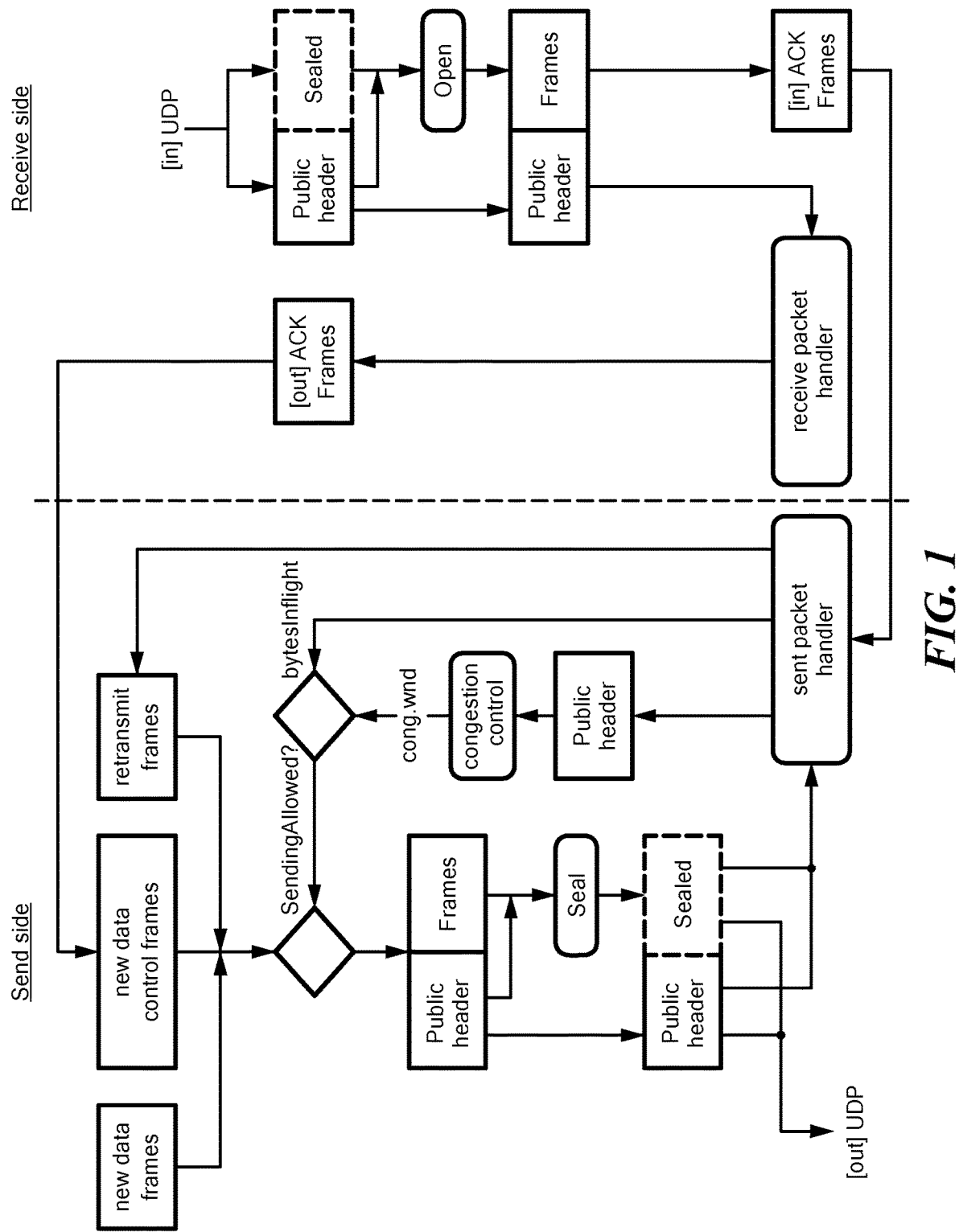
FIG. 1 is a flow diagram of a baseline packet sending and receiving lifecycle in accordance with a prior art QUIC protocol.

Before describing concepts and techniques directed toward a Quick UDP Internet Connections (QUIC) protocol with Network Coded (NC) Forward Error Correction (FEC) and related devices and systems, some introductory concepts and terminology are explained.

As used herein, the term "packet" generally refers to a unit of data transmitted through a network. It should be appreciated that there exists different types of packets and each different type of packet may have a particular structure.

For example, a "User Datagram Protocol (UDP) packet" (or more simply a "UDP packet") is well-known and includes control information (such as network addresses, port number sequencing information, etc.) which is typically included in a section of the packet referred to as a header. Control information can also be included in a trailer.

A "QUIC protocol packet" (or more simply a "QUIC packet") on the other hand, travels inside of (i.e. within the payload portion of) a UDP Packet. A QUIC Packet is thus defined as a well-formed UDP payload that can be parsed by a QUIC receiver. The size of a QUIC packet typically corresponds to the size of an MTU (Maximum Transmission Unit) sized UDP packet's payload (see https://datatracker-.jetf.org/doddraft-ietf-quic-transport/?include text=1. Thus, the structure of a QUIC packet need not include any address or port number in the packet header (since that information would already be included in the UDP packet header. The content of a QUIC packet is specified at https://datatracker.jetf.org/doc/draft-ietf-quic-transport/?include text=1. Among other things, a QUIC packet includes a payload section comprising user or application data. The data may be organized into a sequence of one or more self-identifying frames. The payload section of a QUIC packet is encrypted.

A packet may be made up of "frames." In general, a frame may be considered as its own segmentation of a packet payload. Different frames within a packet's payload may contain different information. Consequently, frames are sometimes referred to with reference to the type of information included therein. For example, an "application data frame" (or more simply, a "data frame" or a "stream frame") comprises data (i.e. a stream or data frame is a frame which includes (or "carries") one or more segments of application data). A data control frame (or more simply a "control frame") may contain control information (e.g. protocol data). An "ACK frame" (which contains acknowledgement related information), for example, is one type of control frame.

It should be appreciated that in certain instances, a frame may comprise, in part, other frames. It should also be appreciated that a frame may contain multiple different types of data/information. Thus, in some instances a frame may include both application data and control information, for example. This may occur, for example, when a frame is comprised of other frames having disparate frame types (e.g. a frame may be comprised of both data and control frames).

As used herein, the term "encoded QUIC packet" (or more simply a "coded packet") refers to a QUIC packet to which networking coding has been applied to at least some portion thereof. For example, and as will be explained in detail further below, in some cases the entire QUIC packet is encoded (e.g. see FIG. 3A). In other cases, only QUIC frames (i.e. a payload portion of a QUIC packet) rather than the entire packet are processed (e.g. see FIGS. 4B, 4C. 5B, 5C).

There are thus at least two different types of encoded QUIC packets, each formed by a different technique.

One type of encoded QUIC packet is referred to as an "externally encoded QUIC packet" meaning a QUIC packet (including all the payload headers and packet portions) to which network coding has been applied. The technique for forming an externally encoded QUIC packet is sometimes referred to as packet level encoding since in this approach coding is performed over the output of the protocol used to form a QUIC packet. Expressed differently, it may be said that the technique used to provide an externally encoded QUIC packet performs coding over a payload of a UDP packet where the UDP packet payload is a QUIC packet.

A second type of encoded QUIC packet is referred to as an "internally encoded QUIC packet" meaning a QUIC packet having a payload to which network coding has been applied. Thus, in contrast to an externally encoded QUIC packet, in an internally encoded QUIC packet, a technique is used in which only the QUIC packet payload is encoded as opposed to the entire packet. Thus, this technique is sometimes referred to as frame level encoding.

As used herein the term "QUIC frames" refers to frames which are in a payload portion of a QUIC packet.

In accordance with the concepts and techniques described herein, QUIC frames may be "re-framed" into so called "packed frames."

Over such packed frames, a network coding technique may be applied to generate a coded frame. Thus, QUIC frames are grouped together into a packed frame to fill a QUIC packet payload and a coded frame refers to the frame generated by applying network coding to the packed frame. The coded frame may thus contain the original data, and is a network coded combination of original data frames (that is, a coded frame could contain data from the frames of several different QUIC packets—e.g. coded frame=packet1 frames+ packet2 frames encoded). Alternatively, the coded frame may be an extra frame for forward error correction. Thus, a coded frame may contain new information provided to a receiver or may be FEC data.

In general overview, disclosed herein are two techniques for generating and receiving coded packets in accordance with a Quick UDP Internet Connection (QUIC) protocol. In a first technique (shown and described in conjunction with FIG. 3 below with the resulting coded packet having a form such as that shown in FIG. 3A), coding is done outside of QUIC. As noted above, this is sometimes referred to as an "external" technique since it is done outside of QUIC; that is, it is not necessary to make any changes to the existing process for forming a QUIC packet. It should, of course, be appreciated that this technique may still be used in the event a change is made to the process for generating a QUIC packet or a QUIC frame.

In a second technique (shown in FIG. 4 with the resulting packet having a form such as that shown in any of FIG. 4B, 4C or 5A or 5B), the coding is done inside of QUIC; that is, implementation of this technique requires some change to the conventional process for forming a QUIC frame and/or packet. As noted above, this is sometimes referred to as an "internal" technique since it is done inside of QUIC.

Referring now to FIG. 1, a flow diagram of a baseline packet sending and receiving lifecycle for a system operating in accordance with a conventional QUIC protocol is shown. FIG. 1 thus illustrates processing in accordance with the conventional QUIC protocol having a public header (e.g. as illustrated in FIGS. 1A and 5).

Figure 1A:
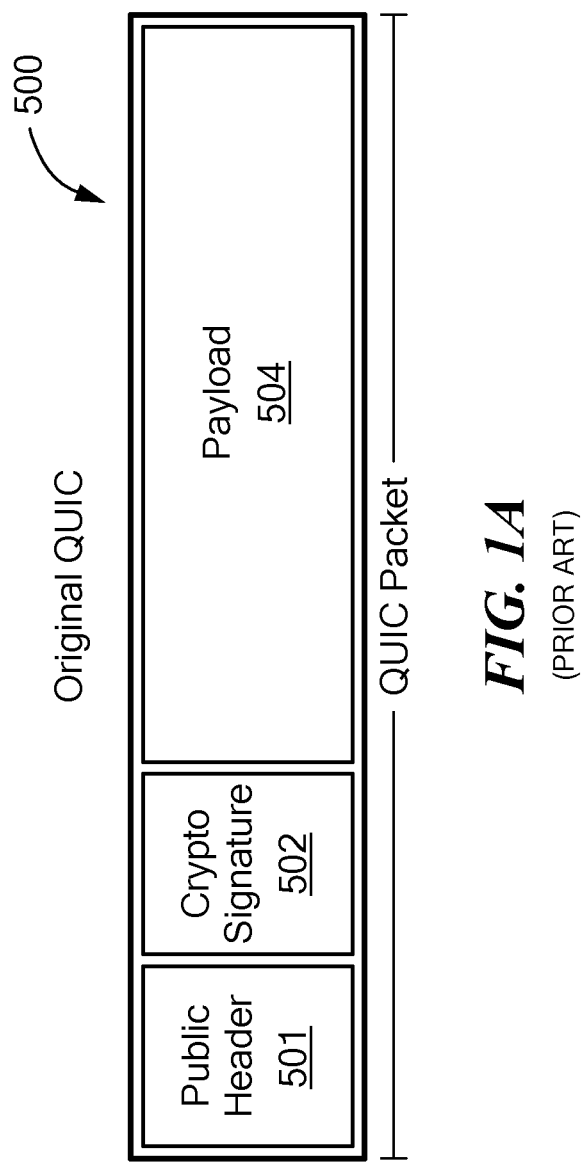
FIG. 1A is a diagram of a conventional QUIC packet.

Referring now to FIG. 1A, a prior art QUIC packet 500 includes a public header 501, a crypto signature 502 (which may also be referred to as a crypto signature header 502) and a payload 504. The public header 501 may include fields such as a public flags field, a connection ID field, a version information field, a diversification nonce field, and a field identifying the packet number. The crypto signature header 502 may include information for decrypting the packet. The payload field 504 may include the data payload of the packet. A data packet's payload contains a sequence of frames. The data payload 504 may be encrypted prior to transmission. In prior art systems, implementing XOR based FEC, a FEC group number may be included in the public header 501.

Figure 2:
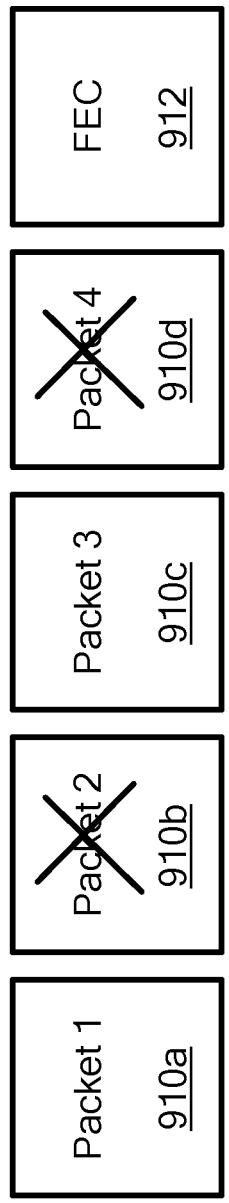
FIG. 2 is a diagram of a sequence of packets which illustrates a disadvantage of FEC XOR processing.

Referring now to FIG. 2, a sequence of prior art QUIC UDP packets 910a-910d are followed by a forward error correction (FEC) packet 912. In a conventional QUIC application utilizing an FEC solution based upon an XOR operation, the exclusive OR sum of the payloads is calculated for a specific set of packets, that sum is transmitted in a redundancy FEC packet. If a single packet is lost, its contents may be recovered from the remaining packets used in the XORing operation, plus the FEC packet.

If more than one packet is lost, however, it is not possible for the receiver to reconstruct the lost packet as also one of the remaining packets used in the XORing operation is permanently lost due to frame based retransmission and packet based loss. Thus, more than one packet loss would mean the FEC packet would not be useful for reconstructing the lost packets.

In contrast to the prior art techniques of FIGS. 1 and 2 (which generate and utilize, respectively, the packet structure of FIG. 1A), the techniques described herein below enable the use of an arbitrary number of FEC packets.

For example, one of the techniques described herein below enables the use of Network Coding (NC) for generating an arbitrary number of packets containing information for forward error correction (i.e. NC FEC packets). As will become apparent from the description hereinbelow, it is possible to generate an arbitrary number of FEC packets using the architecture/techniques of FIG. 3 or FIG. 4 described below.

Thus, simply stated, when operating in accordance with a conventional QUIC FEC protocol, if only one packet is lost (e.g. packet 910d in FIG. 2), then the system can recover the information—e.g. by sending the sum of packets 910a-910c (i.e. recovery may be accomplished via the XOR).

However, in the case in which multiple packets are lost (e.g. packets 910b and 910d in FIG. 2), then the system cannot recover the information using the sum (i.e. the XOR), as this scheme can only recover one missing packet. This is the case even if the content of a lost packet was re-transmitted, because the re-transmitted data will not be the same packet which was used when originally calculating the XOR. That is, rather than retransmitting the same packet (which would allow recovery of the information), prior art QUIC FEC systems send a new packet containing the re-transmittable frames. Thus, when multiple packets are dropped, the same mix of packets is not available for an FEC XOR decoding operation.

It may thus be understood that a problem with this prior art approach is that while the loss happens on a packet level, the retransmission occurs on a frame level. Since conventional QUIC never sends the same packet twice, if more than one (1) packet is lost, the XOR FEC could not help due to the frame level based retransmission of conventional QUIC.

Figure 3:
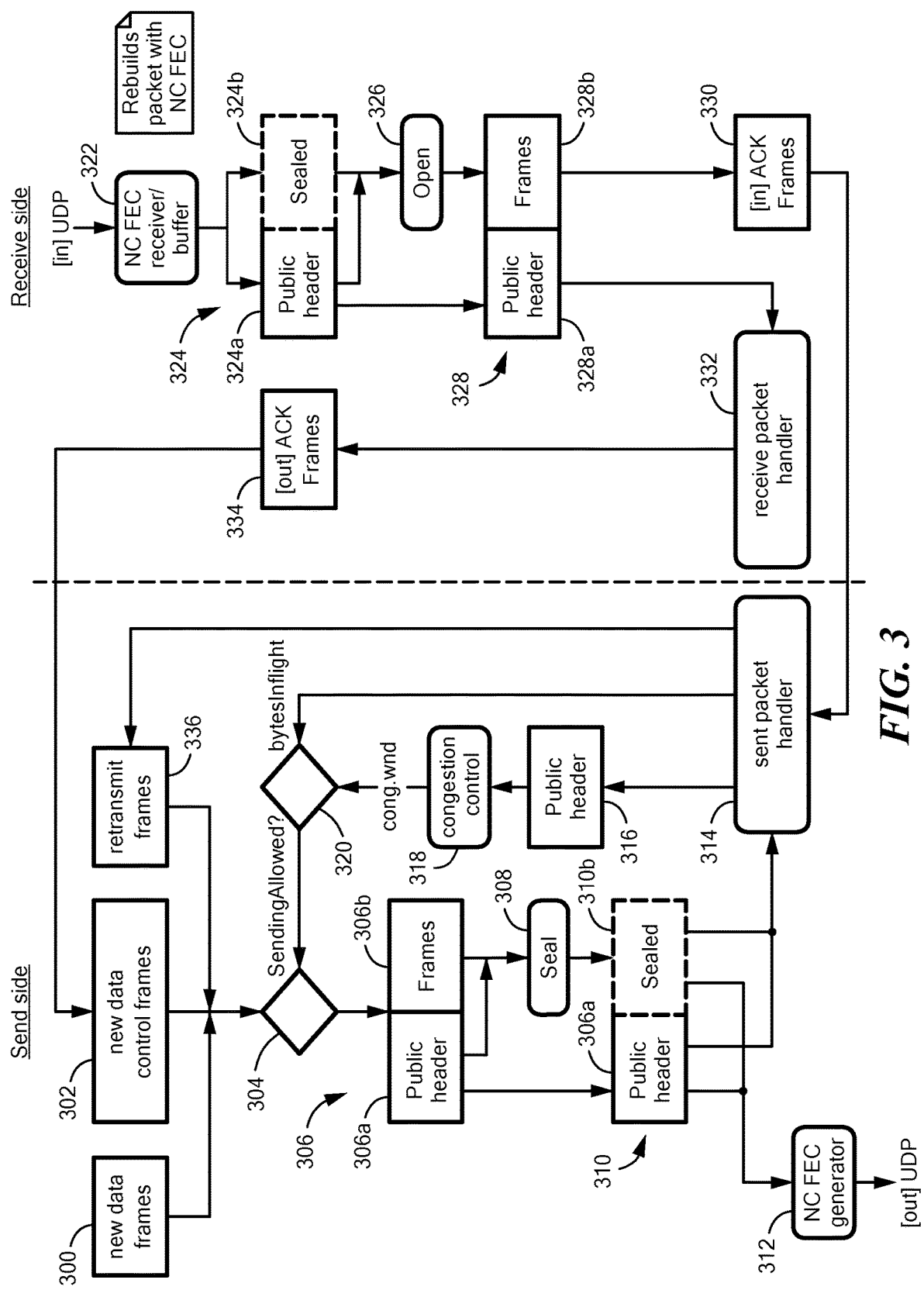
FIG. 3 is a flow diagram of a process for generating, sending and receiving a coded packet in accordance with a QUIC protocol.

Referring now to FIG. 3, shown is a flow diagram of a QUIC packet sending and receiving lifecycle having packet level network coded (NC) forward error correction (FEC).

In the technique illustrated in FIG. 3, network coding is applied to "sealed" (i.e. encrypted) QUIC packets. That is, on a send side, an encryption process is performed to generate a conventional QUIC packet before applying NC FEC. Conversely, on a receive side, packets are first recovered using NC FEC and then the packets are decrypted. Thus, this technique may be described as being may be implemented "outside" of QUIC (i.e. the technique is not native to QUIC).

Turning now to FIG. 3, send side processing to generate a coded packet according to packet level network coded (NC) forward error correction (FEC) (i.e. an externally encoded QUIC packet), such as the packet shown below in FIG. 3A, begins with new stream frames 300 and new control frames 302 being combined to generate a packet 306 having a public header 306a and frames 306b. An encryption operation 308 is performed to provide a QUIC packet 310 having the public header portion 306a and an encrypted (or sealed) portion 310b. The packet 310 is provided to a network coded FEC generator 312 which generates the coded packet.

The packet (e.g. a packet having the form of FIG. 3A) is then provided for transmission over a UDP connection. It should be appreciated that one or more NC FEC packets are sent after every N packets. Significantly, and as will be described further below, in embodiments N may change during the transmission.

It should also be appreciated that packet level network coded forward error correction uses explicit feedback. In the explicit feedback approach, a client sends a reply explicitly indicating which packets were received. Such explicit feedback appears in the encoded response's header (e.g. the codec's feedback is included in a header of the coded packet. That is, when the client sends an encoded packet to the server, the codec's feedback is also included in the header which will be used by the server in its reply. The server will use the feedback, when it (i.e., the server) generates further encoded packets. An example of coded packets which include explicit feedback is described below in conjunction with FIG. 3A.

It should be further appreciated that with the architecture described herein, any data modification can fit, including data/packet generation and data drop. This makes it possible to add any type of FEC algorithm processing to the QUIC. It is thus possible to keep open all possible techniques for creating coded packets compatible with FEC. Such techniques include, but are not limited to XOR, Full RLNC, and sliding window NC based packet generation.

On the receive side, a UDP transmission packet is received in a NC FEC receiver/buffer 322 which rebuilds packets with FEC to provide a packet 324 having a public header portion 324a and a sealed portion 324b. The sealed portion of the packet is open at 326 to provide packet 328 having the public header 328a and frames 328b (which are the same frames as frames 306b). The packet is provided to a receive packet handler 332 which provides acknowledgement frames 334 back to the sender. Also at 330 acknowledgment frames are provided to send packet handler 314 which in turn provides information to congestion control module 318 and retransmit frames 336.

In view of the description provided herein, those of ordinary skill in the art will now appreciate that packets generated in accordance with the technique described herein in conjunction with FIG. 3, may be used in practical systems utilizing a QUIC protocol. Furthermore, after reading the disclosure provided herein, those of ordinary skill in the art should also appreciate, for example, that different methods of network coding can be applied to generate coded packets. For example, one can use sliding window, full network coding, sparse network coding, systematic coding or combination of the aforementioned techniques. The different methods may use different amounts of data to code. Sliding window uses a window of packets to which network coding is applied to generate a coded packet. A sliding window may also be applied over a generation (i.e. over a group of packets) or can be generationless. Full network coding techniques code all packets in a given generation. Sparse network coding techniques use only some of the packets in a generation. Systematic coding methods first send original packets then the coded ones for erasure/error correction.

Figure 3A:
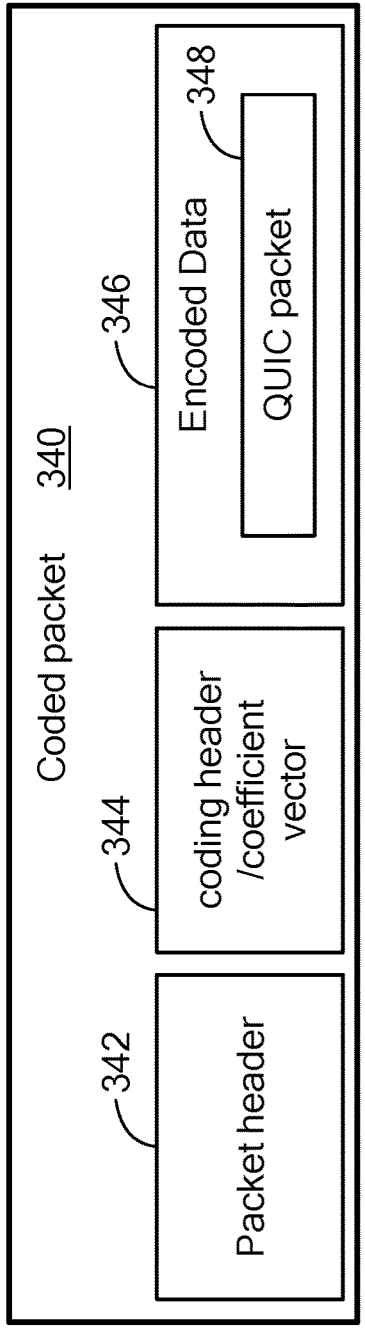
FIG. 3A is a diagram of an illustrative coded packet of the type produced by the process of FIG. 3.

Referring now to FIG. 3A, a coded packet 340 of the type which may be generated with the processing of FIG. 3, comprises a packet header 342, a coding header/coefficient vector 344 and a QUIC packet 348. Packet header 342 may include the feedback information described above.

Figure 3B:
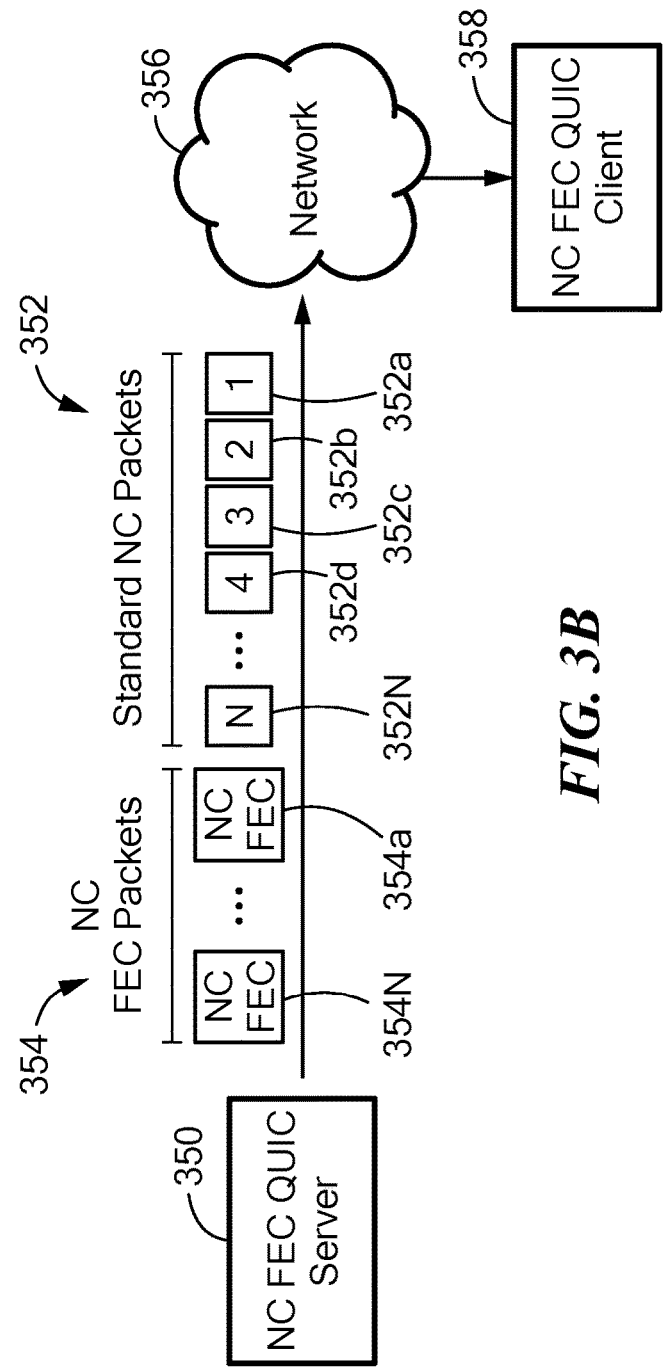
FIG. 3B is a block diagram of a system configured to generate, send and receive packets generated in accordance with the process of FIG. 3.

Referring now to FIG. 3B, in response to a request from an NC FEC QUIC client 358, an NC FEC QUIC server 350 generates N Network Coded (NC) packets 352 followed by one or more NC FEC packet 354 in accordance with the send side technique described in FIG. 3. It should be appreciated that one or more NC FEC packets 354 are sent after every N packets 352. Significantly, in embodiments N may change at any time during the transmission or may be constant. The manner in which N may (or may not) change depends upon the specific implementation of the embodiment (e.g. taking into account a number of factors including but not limited to channel characteristics). The packets 352, 354 are transmitted via a UDP connection to the NC FEC QUIC client 358 which comprises a receiver capable of operating in accordance with the technique of FIG. 3 and thus is capable of parsing a coded packet such as the coded packet of FIG. 3A which includes a QUIC packet. As noted in conjunction with FIG. 3, one or more NC FEC packets 354 are sent after every N NC packets 352. In one embodiment FEC is implemented via XOR logic.

Figure 4:
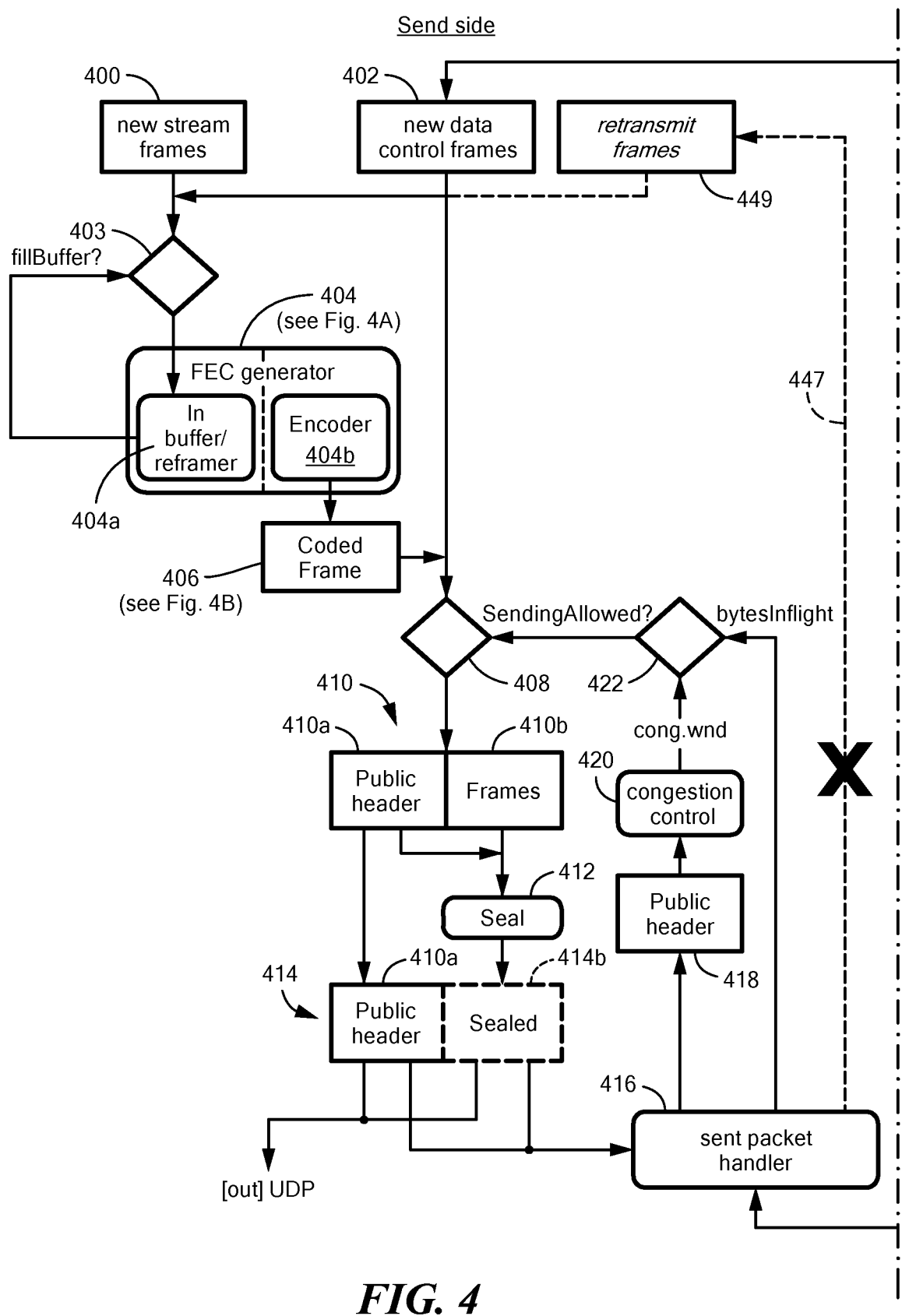
FIG. 4 is a flow diagram of another embodiment of a process for generating, sending and receiving a coded packet.
Figure 4:
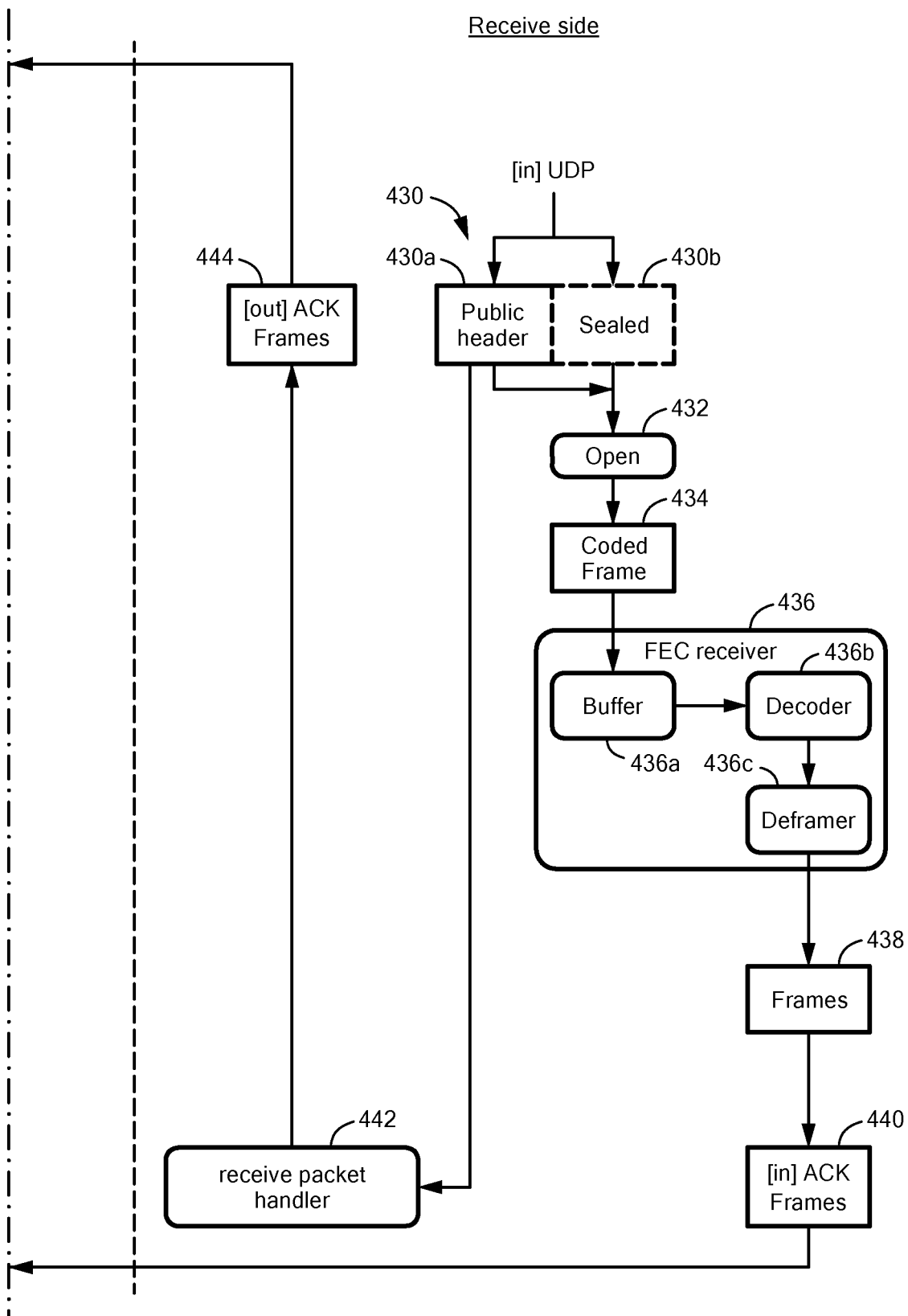

Referring now to FIG. 4, a flow diagram of another embodiment of a packet sending and receiving lifecycle having frame level encoding is shown. It should be appreciated that although FIG. 4 illustrates a sliding window network coding technique, other network coding techniques may also be used. Furthermore, although in the case where a sliding window technique is used, explicit feedback will generally not be used. It should, however, be understood that in other embodiments, it may be preferable (or even necessary) to use other types of network coding (i.e. other than a sliding window technique) in which case it may be preferable (or even necessary) to utilize explicit feedback.

In the technique illustrated in FIG. 4, reframing (for example in the FEC generator), is utilized to bundle (or group) QUIC frames into one QUIC packet payload size frame (referred to herein as a packed frame) to which network coding (NC) is applied to generate coded frames (i.e. NC coded frames). This technique may be thought of as being implemented inside of QUIC (i.e. the technique is native to QUIC). Thus, as noted above, the technique of FIG. 4 is sometimes referred to herein as an internal technique (since the technique is internal to QUIC processing).

As will be described below, in an embodiment the illustrative technique of FIG. 4 generates an NC coded frame (FIG. 4B, 4C, 5A, 5B) having a codec header (e.g. a coefficient vector and some other codec related information from the codec). That is, a coefficient vector is built into the frame. Thus, the technique of FIG. 4 can generate a packet including a frame having the form illustrated in FIG. 4B (inferred feedback) or the form illustrated in FIG. 4C (explicit feedback).

In the case of feedback, when using a siding window codec, it is necessary to know on the sender's side which encoded frames were received by a client as this information is used when encoding the next frame to send (e.g. if the previous frames weren't received, they may be included it in the encoding of the next frame).

To get such feedback there are two approaches. In a first approach, referred to as an explicit approach, the client sends a reply explicitly indicating which frames were received. As discussed above, this appears in the encoded response's header. That is, when the client sends an encoded frame to the original server, they also include the codec's feedback in the header which will be used in the server's reply.

In a second approach, referred to as an inferred approach, in the original sender, it is stored which encoded frame was sent out in which packet. Reliance is then placed on the QUIC packet acknowledgement system, which tells whether a packet was received. If a packet was received, then the feedback the client would have provided is recreated based upon the knowledge about which frame went out in which packet and which packet was received.

The explicit approach thus requires the client to send a response containing the feedback to the server each time they receive an encoded frame. Because the feedback travels in the header section of an encoded frame, the response must contain one such encoded frame (which may or may not contain additional data, i.e. in some embodiments it may contain only the feedback without including any meaningful data). This technique works well if the server-to-client and client-to-sever channels have a similar, or substantially the same, amount of traffic (e. g. such as in p2p file sharing applications).

One difference between the techniques of FIGS. 3 and 4 is that in the approach of FIG. 3, QUIC doesn't know about the coded packets (and as noted above is implemented external to QUIC since the encoding occurs after sealing).

In the technique of FIG. 4, on the other hand, valid QUIC frames are generated and transmitted (i.e. frames capable of being processed via QUIC) and the encoding occurs before sealing.

As will become apparent from the description hereinbelow, in the technique of FIG. 4 the sender requires feedback. Such feedback can be generated in two (2) ways: 1) via an implicit/inferred technique using QUIC ack frames and based upon generating a feedback vector that a codec may use (such as the Kodo codec); and 2) by explicitly sending a feedback vector.

As explained above in conjunction with FIGS. 1-1A, it should be understood that in the prior art approach, the packets are first encrypted (or "sealed") and then they are coded with an FEC code (i.e. an XOR FEC code). Furthermore, in the prior art approach, the same code is used for each packet. Also in the prior art approach, QUIC was not aware of the extra FEC packet.

In the technique illustrated in FIG. 4, however, the QUIC frames are first coded using network coding (i.e. the packets are coded on the inside) and then the packets are encrypted (or sealed).

It should, of course be appreciated that with the architecture described herein, it is possible to keep all the possibilities open for creating coded packets including creating coded packets compatible with FEC. So XOR, Full RLNC, sliding window NC based packet generation are all possible. It should also be appreciated that although FIG. 4 illustrates a sliding window technique, other network coding techniques may also be used. Furthermore, although in the case where a sliding window technique is used, additional FEC packets will generally not be used, it should be understood that in other embodiments, it may be preferable (or even necessary) to use other types of network coding (i.e. other than a sliding window technique) in which case it may be preferable (or even necessary) to utilize additional FEC packets.

Figure 4A:
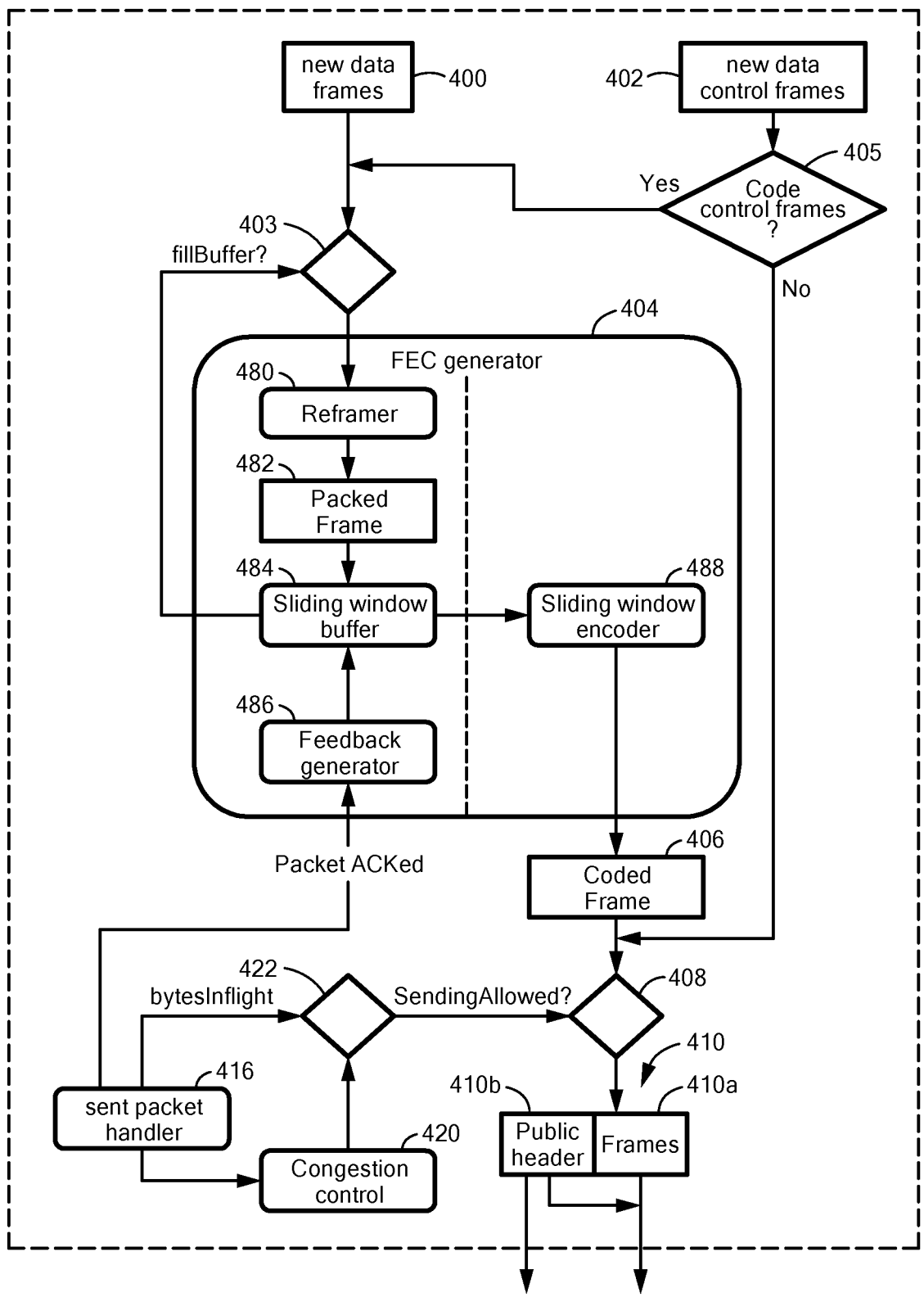
FIG. 4A is a flow diagram of a forward error correction (FEC) generator process.
Figure 4B:
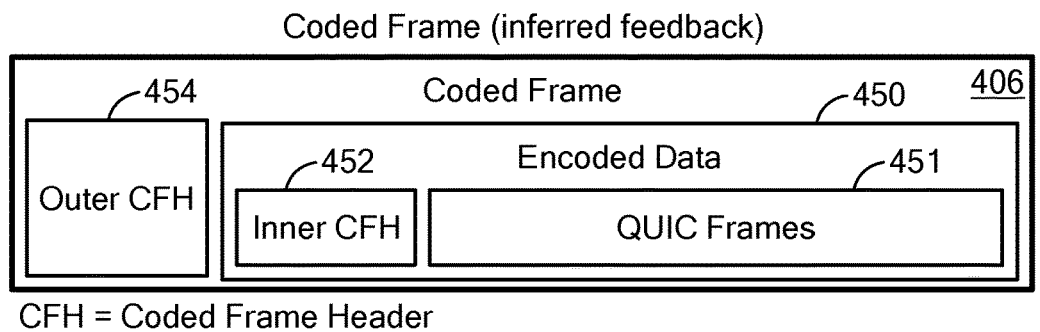
FIG. 4B is a diagram of an illustrative network coded (NC) coded frame having inferred feedback.
Figure 4C:
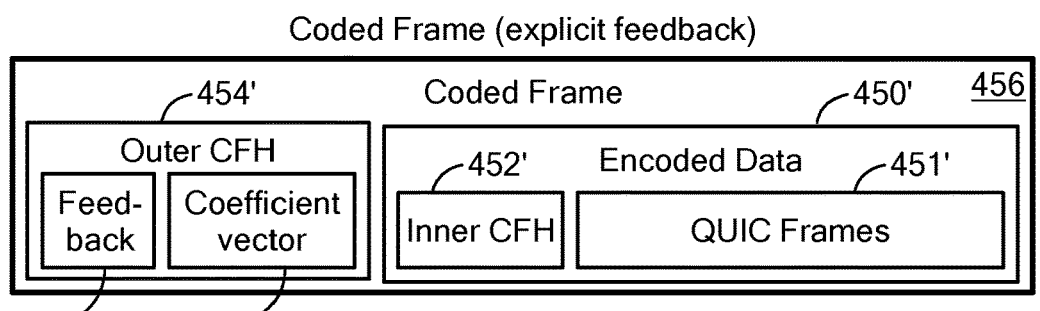
FIG. 4C is a diagram of an illustrative NC coded frame having explicit feedback.

Turning now to FIG. 4, a send side process for generating a packet having an NC coded frame having feedback (e.g. either explicit feedback as shown in FIGS. 4C and 5A or implicit feedback as shown in FIGS. 4B and 5B) is shown with the particular architecture/technique of FIG. 4 illustrating inferred feedback. The process begins with data being grouped into streams, which are forwarded using stream frames and new stream frames 400 and new data control frames 402 being provided to a coding generator here illustrated as FEC generator 404.

Coding generator 404 receives one or more QUIC frames re-frames the QUIC frames 404a to provide a packet frame which is then encoded in an encoder 404b into one packet size coded frame 406. It should be appreciated that coded frame 406 may contain one or several QUIC frames.

Turning briefly to FIG. 4B, an illustrative coded frame 406 includes an inner coded frame header ("inner CFH") 452 comprising an original length portion (i.e. a number of bits representing a length (before padding such as zero padding) of the original frames such as frames 400, 402), an outer coded frame header ("outer CFH") 454 comprising a co-efficient vector and an encoded data portion 450 comprising one or more QUIC frames 451. Thus, each coded frame has at least one inner CFH and one outer CFH.

In alternate embodiments, it should be appreciated that data contained within the inner CFH and/or portions of the outer CFH may be distributed among other portions of the frame. Thus, in an embodiment, coded frame 406 may include at least a first frame portion with encoded data which includes one or more QUIC frames and an original length; and a second frame portion with a coefficient vector (i.e. a vector containing the coding coefficients used in the network coding). It should be appreciated that the original length must be included within the encoded data portion of the coded frame, otherwise when reconstructing data from multiple packets, it would not be possible to know which original length applies to which packet. It should also be appreciated that in some embodiments, a coefficient vector may be built into the coded frame and the coefficient vector may be a portion of (or all of) a codec header.

It should also be appreciated that the QUIC frames are reframed into a packed frame. Over such packed frames, sliding window network coding may be performed to generate the coded frame. Thus, a coded frame may contain new information to the receiver or may be an FEC (forward error correction) frame/data.

In some embodiments, a sliding window encoder (e.g. of the type available in the Kodo library), may be used. In an embodiment, the sliding window encoder may operate in the following manner: first, an encoder is fed with new data (e.g. new stream frames and in particular, stream frames which have been reframed to form packed frames) and in response thereto increases the window size of the sliding window encoder; a sender sends a packet to a receiver and upon reception of the packet the receiver sends an ACK packet back to the sender; second (in the case in which inferred feedback is used), from the ACK, a sliding window feedback is generated—e.g. an ACK, represented in a binary vector (it should, of course, be appreciated that in case of explicit feedback, it is not necessary to generate feedback since the receiver sends it back explicitly); third, the sliding window encoder receives the feedback and in response thereto may reduce the size of the sliding window. The technique is thus referred to as a sliding window technique, because new packets are added to the encoder and old ones are removed.

Returning again to FIG. 4, it should be appreciated that FEC generator 404 consumes data and generates encoded data asynchronously. If in decision block 408 it is determined that sending is allowed, a packet 410 having a public header portion 410a and a frames portion 410b (e.g. having at least one internally encoded frame) is formed.

The frames are then encrypted (i.e. "sealed") 412 and a packet 414 having public header portion 410a and sealed portion 414b is provided at an output for transmission over a UDP connection to a client. A sent packet handler 416 receives information related to the transmitted packet. Such information may, for example, be a copy of the sent packet.

Examples of packets 414 which may be formed by the process of FIG. 4 are shown in FIGS. 5A and 5B.

On the receive (or client) side, a packet 430 is received and opened (i.e. decrypted) via process 432 to reveal a coded frame 434. In the case where received packet 430 is the same as transmitted packet 414, the coded frame 434 would be the same as coded frame 406. Coded frame 434 is provided to an FEC receiver 436 which buffers, decodes (e.g. with network coding) and deframes 436a, 436b, 436c the frame to provide de-coded frames 438. In the case where received packet 430 is the same as transmitted packet 414, then frame 438 would be the same as frames 400 (and 402 if included).

A receive packet handler 442 provides an acknowledgment 444 back to the send side. An acknowledgment 440 is also sent to the send side sent packet handler 416. Significantly, sent packet handler 416 need not initiate re-transmission of retransmit frames 449 along path 447. The sent packet handler 416 also provides information to congestion control module 420 which in turn aids in deciding whether sending is allowed.

Significantly, by eliminating the need for feedback 447 from the sent packet handler 416 to the retransmit frames process 449, the system disables the retransmission of stream(data) frames, because in the technique of FIG. 4, FEC generator 404 handles the lost packets.

This is in contrast to the prior art approach which, as described above in conjunction with FIGS. 1-2, retransmits frames (i.e. in the prior art approach of FIG. 1 the system sends a new packet containing the re-transmittable frames).

It should be appreciated that sliding window network coding encoders are known. In general, a window size utilized in such encoder can vary between 1 and a maximum window size of N where N can, theoretically, be an infinitely large number. Those of ordinary skill in the art will appreciate how to select the value of N in practical systems.

In case of using a sliding window network coding technique as described in FIG. 4, a window size management strategy is required. Selection of a particular window size management strategy will depend, at least in part, upon the particular characteristics of the system in which the sliding window network coding technique is employed. In some cases, it will be desirable to increase the size of the window used in a sliding window encoder and in other cases it will be desirable to decrease the window size.

In the example embodiment of FIG. 4, the following strategy may be used. If the window size is less than a predefined limit Wmax and it is not desired to send additional FEC data with coded frames to be next generated, then the window size is permitted to increase. If the window size is permitted to increase and there are available new packed frames, then the window size is increased to accommodate such new packed frames.

Generally, it is desirable to keep the window size small to reduce the amount of time required for calculation overhead. Thus, as soon as the sender is certain that a particular packed frame has arrived at the receiver (meaning that a receiver was able to decode at least some of the coded frames provided thereto so as to obtain that packed frame), that packed frame can be removed from the window, thereby reducing the size of the window.

In some instances, it is possible for the window size to be reduced to a value of one (i.e. window size=1). In embodiments, it may be preferable or even necessary to set the window size equal to a value of one (e.g. the predefined limit Wmax is set to one). Regardless of how the window size reaches one, in this case the FEC generator 404 operates on only a single packed frame. Since at least two (2) frames are required to perform network coding, this means the FEC generator provides a frame without any coding (i.e. coded frame 406 does not, in fact, contain any coding). Thus, in effect, the packed frame is sent without any modification.

In the illustrative technique described herein in conjunction with FIG. 4, the window size of the sliding window may take on a value of one (1) if the roundtrip time (RTT) is such that the acknowledgements are received faster than new packed frames are created (e.g. RTT is close to zero). Furthermore, the window size can be one (1) if the loss on the channel is greater than or equal to some predetermined percentage (e.g. 50%) since in this case it may desirable to repeat all the packets one or several times. It should, however, be noted that in this case, although the window size may reach or be set to one, it does not have assume a value of one, depending upon other factors such as the RTT value.

In the case where the loss on the channel is greater than or equal to 50% and the RTT is relatively long such that ACKs are not received faster than new packed frames are created), it may desirable to utilize a window size larger than one (i.e. such that coded packets are sent). In general, the window size will tend to increase with the randomness of the channel (higher number of unpredicted losses, longer RTT) and will tend to decrease as a network becomes more stable and predictable.

It should be understood that the window size can assume a value of one (1) in case of any combination of the above-mentioned factors or other factors (e.g. including, but not limited to the requirements/limitations of a particular application/system, the RTT, the channel loss as well as other channel and system characteristics). As noted above, it is also possible to simply set the window size to one (e.g. if it is known that the RTT is close to zero).

In view of the above, it should be appreciated that finding a preferred (or ideally, an optimum) window size management strategy is not trivial. Depending upon the requirements of a particular application, different window sizing strategies (i.e. different from that described above) may be used in which case a window size may reach (or be set to) a value of one (1) in a manner that is different from the examples described above.

Regardless of the manner in which the window size reaches one, when a window size of one exists, the packet is not coded. Thus, in this case the system may generate and operate with some or even all uncoded packets.

In view of the description provided herein, those of ordinary skill in the art will now appreciate that packets generated in accordance with the technique described herein in conjunction with FIG. 4, whether coded or uncoded, may be used in practical systems utilizing a QUIC protocol. Furthermore, after reading the disclosure provided herein, those of ordinary skill in the art should also appreciate, for example, that different methods of network coding (i.e. different from the sliding window technique shown in FIGS. 4 and 4A) can be applied to generate coded frames. For example, in addition to sliding window, one can use full network coding, sparse network coding, systematic coding or combination of any of the aforementioned techniques. The different methods may use different amounts of frames to code. Sliding window uses a window of frames to which network coding is applied to generate a coded frame. A sliding window may also be applied over a generation (i.e. over a group of frames) or can be generationless. Full network coding codes all the frames in a given generation. Sparse network coding method uses only some of the frames in a generation. Systematic coding methods first send the original frames then the coded ones for erasure/error correction.

Referring now to FIG. 4A, in which like elements of FIG. 4 are provided having like reference designations, a process performed by FEC generator 404 to generate coded frames (e.g. of the types shown in FIGS. 4b, 4C) using a sliding window technique is shown. In the FEC generator 404 process, new stream frames and possibly new data control frames are provided as QUIC frames and are re-framed as shown in processing block 480 to form packed frames 482. In one illustrative re-framing process, the original QUIC frames are considered as a byte array and combined (e.g. concatenated together). If the amount of data resultant from such a combining operation is not sufficient to fill the predefined packed frame size (which in some embodiments is ideally equal to the size of a QUIC packet frame), the data may be padded (e.g. with zeros) to meet the desired size. The reframing process produces a packed frame 482 which is then added to a sliding window buffer as shown in processing block 484.

In processing block 484 the packed frame is combined with information from feedback generator 486 and one or more frames are provided to a sliding window encoder as shown in processing block 488. In operation, sliding window-network coded encoder is continuously fed with frames or packets, as appropriate to the architecture. On every new QUIC data 400, the sliding window-network coding window is increased and on successfully delivered frames or packets, as appropriate to the architecture (e.g. from feedback generator 486) the window is decreased (i.e. delivered packed frames are removed from the buffer).

Sliding window encoder 488 applies sliding window network coding to the packed frames and generates coded frame 406. Thus, sliding window network coding is performed over the packed frames in the sliding window buffer to generate the coded frame 406.

Referring now to FIG. 4C, an illustrative coded frame 456 includes an inner coded frame header (CFH) 452' and an outer CFH 454'. Coded frame 456 is provided having explicit feedback and thus outer CFH contains feedback 458 and the NC coefficient vector 459. Inner CFH 452' contains an NC header (i.e. an original length portion corresponding to a number of bits representing an original length (before zero padding) of the original frames such as frames 400, 402). Coded frame 456 also includes an encoded data portion 450' comprising one or more QUIC frames 451. It should be noted that the original length must be included with the encoded block of QUIC frames in order to allow for proper decoding (otherwise, when reconstructing original data from multiple packets, it would not be possible to know which original length is associated with which packet). Thus, each coded frame has one inner CFH and one outer CFH.

Coded frame 456 thus includes the codec's feedback in the inner CFH 452'. This is in contrast to coded frame 406 (FIG. 4B) which utilizes inferred feedback (and thus the codec's feedback is not included in inner CFH 452 of coded frame 406.

The original length co-efficient vector and codec feedback may each be included in separate portions or frames of a coded frame. Thus, in an embodiment, the coded frame may include a first frame portion with encoded data which includes one or more QUIC frames and an original length; a second frame portion with a coefficient vector; a third frame portion comprising codec feedback.

As explained above, QUIC frames are reframed into a packed frame. Over these packed frames, sliding window network coding is performed to generate the coded frame. Thus, a coded frame may contain new information to the receiver or may be an FEC (forward error/erasure correction) frame/data.

Figure 4D:
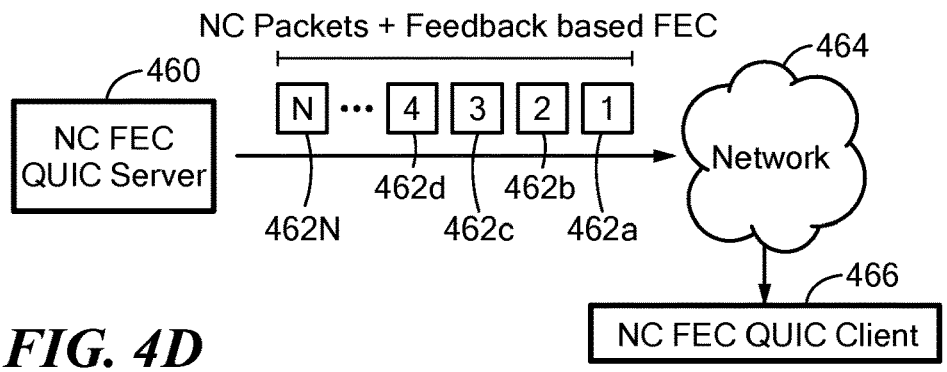
FIG. 4D is a block diagram of a system configured to generate, send and receive NC coded packets generated in accordance with the process of FIG. 4.

Referring now to FIG. 4D, in response to a request from an NC FEC QUIC client 466 (i.e. a client capable of receiving and partitioning packets/frames of the type described above in conjunction with FIGS. 4-4C), an NC FEC QUIC server 460 generates N NC packets 462a-462N. Each of the packets 462 may be the same as or similar to packets described above in conjunction with FIGS. 4B and/or 4C (i.e. coded frames provided as part of a QUIC packet). The NC packets 462a-462N are transmitted via a UDP connection from the NC QUIC server 460 to the NC QUIC client 466.

It should be appreciated that in the sliding window approach of FIG. 4, FEC packets are not explicitly created (since error correction is handled by the codec—e.g. FEC generator 404—based upon the feedback provided thereto).

It should, however, be understood that, in other embodiments of frame level coding (i.e. embodiments which use network coding techniques other than a sliding window technique), additional FEC packets may be used.

It should be understood that the techniques described above in conjunction with FIGS. 3 and 4 may be used individually or in combination.

Figure 4E:
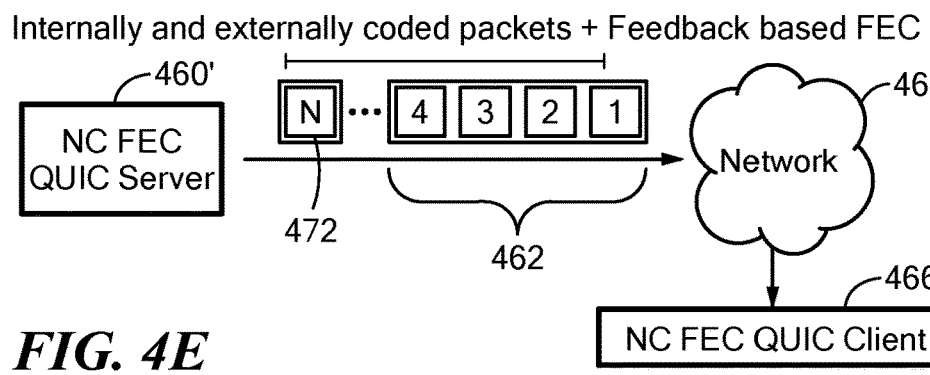
FIG. 4E is a block diagram of a system configured to generate, send and receive coded packets generated in accordance with a combination of the processes of FIGS. 3 and 4.

Referring now to FIG. 4E, an example of a system operating with packets generated using a combination of the techniques described above conjunction with both FIGS. 3 and 4 is shown. In particular, a frame level encoding technique (e.g. an internal technique such as that shown in FIG. 4) is first used to generate coded frames (e.g. of the types shown in FIGS. 4B, 4C). Such coded frames are then subject to a packet level coding technique (e.g. an external technique such as that shown in FIG. 3) to generate frames of the type describe above in conjunction with FIG. 3A.

It should, of course, be appreciated that the flow in an actual system would be significantly more complex than that shown in FIG. 4E. QUIC consist of streams. A client sends a request, a new stream is created between the client and a server (it's a virtual connection inside one UDP connection). The streams are generating stream(data) frames that are given to the coding generator that generates the coded frames. The coded frames are travelling in a QUIC packet.

In response to a request from an NC QUIC client 466', an NC QUIC server 460' generates N, here 4, packets 462 in accordance with the send side technique described in FIG. 4. Thus, each of the packets 462 include coded frames as a payload as described above in FIG. 4B. The packets 462 are followed by an NC FEC packet 472 in accordance with the send side technique described in FIG. 3. The packets 462, 472 are transmitted via a UDP connection to the NC QUIC client 466'. As noted above in conjunction with FIG. 3, an FEC packet 472 is sent after every N packets 462.

Referring now to FIG. 5, a prior art QUIC packet 500' which may be the same as or similar to packet 500 of FIG. 1A, includes a public header 501', a crypto signature 502' and a payload 504'. The public header 501' may include fields such as a public flags field, a connection ID field, a version information field, a diversification nonce field, and a field identifying the packet number. The crypto signature header 502' may include information for decrypting the packet. The payload field 504' may include the data payload of the packet. The data payload 504' may be encrypted prior to transmission.

Referring now to FIG. 5A, a coded packet 505 having explicit feedback includes a public header 506, a crypto signature header 508 and a coded frame 507 (i.e. the dashed portion of packet 505). It should be appreciated that coded frame 507 may be the same as or similar to coded frame 456 described above in conjunction with FIG. 4C. In this illustrative embodiment, coded frame 507 comprises an outer coded frame header (CFH) 510, an inner CFH 512 and an effective payload 514. Outer CFH 510 comprises a feedback portion 510a and a coefficient vector 510b. The packet in FIG. 5A may be produced, for example, by a process such as the process illustrated in FIG. 4.

In contrast to the coded packet of FIG. 5A, it should be understood that prior art QUIC techniques use the same code (i.e. a straight sum of all the packets that were combined). Thus, in prior art QUIC techniques a QUIC packet does not include an outer CFH which includes information representing a code (since the codes did not change in the prior art approach, there was never anything to represent in any header of a prior art packet used with QUIC).

Public header 506 may be the same as or similar to public header 501' and may have a length between 1 and 51 bytes. Similarly, crypto signature header 508 may be the same as or similar to crypto signature header 502, and may have a length of 12 bytes. Headers 506, 508, may of course be provided having any number of bytes required for proper operation in accordance with a particular application.

Outer CFH 510 may be a forward error correction header generated using a network coding algorithm. In embodiments, outer CFH 510 may include information, such as for example, meta information about the frame (such as a type ID, for example) and also the feedback, (in the case of explicit feedback). Inner CFH 512 includes at least an original length that can be used to recover packets via a network coding technique. As noted above, the original length information must be included in the encoded data portion of the coded frame. A network coding technique may be used, for example, to recover one or more QUIC packets that were not received at a destination.

Outer CFH 510 is provided having a length sufficient to hold an amount of information. In one illustrative embodiment, outer CFH 510 may be provided having a length which relates to a generation length of the packet, frame, stream, etc. that is used to generate the outer CFH. The particular length of outer CFH in any application is based upon a variety of factors including but not limited to the manner in which network coding is being implemented. In some embodiments a generationless sliding window technique may be used while in other embodiments, other network coding techniques may be used).

Generation length is the number of packets or frames that are grouped together in one encoder. In the case of full NC, coding is applied to all of packets/frame or in the case of sparse NC, coding is applied to a subset of these packets/frames. For example, in a case where 10 packets/frames are grouped together, the generation length=10. In case of generationless sliding window, generation length is undefined, but the window specifies the group of packets or frames that are coded together. Thus, in case of coding 10 packets/frames together, the window size is=10. In case of a true generationless sliding window implementation, the window length may theoretically vary between 1 and infinity.

In general the length of inner CFH 512 is selected considering a generation length g of the packet, frame, stream, etc. that is used to generate the outer CFH. Inner CFH 512 may include information about the network coding scheme mentioned above. For example, inner CFH 512 may include information such as coding coefficients, or other information that can be used in decoding. In case of network coding, it is only necessary to collect enough packets in order to perform decoding. It should thus be appreciated that in the case of sliding window, there is no need for the receiver to explicitly distinguish between FEC and normal packets.

Payload 514 may include the data to be received by the receiver. In an embodiment, the length of payload 514 may be the length of a QUIC payload less the length of the inner and outer CHF headers 510 512.

Referring now to FIG. 5B, a QUIC packet 515 having inferred feedback, which may be produced by a process such as the process illustrated in FIG. 4, for example, includes a public header 516, a crypto header 518 and a coded frame 517 (i.e. the dashed portion of packet 515) which may be the same as or similar to coded frame 406 described above in conjunction with FIG. 4B. In this illustrative embodiment, coded frame 517 comprises an outer CFH header 520, an inner CFH header 522 and an effective payload 524.

Public header 516 may be the same as or similar to public header 501'. In illustrative embodiments, public header 516 may have a length of up to 51 bytes (e.g. between 1 and 51 bytes). Similarly, crypto signature header 518 may be the same as or similar to crypto signature header 502', and in one embodiment may have a length of up to 12 bytes.

Outer CFH header 520 may be a forward error correction header generated using a network coding technique. In embodiments, outer CFH header 520 may include information, such as coefficients, for example, that can be used to solve a network coding algorithm. The network coding algorithm may be used, for example, to recover one or more QUIC packets that were not received at a destination.

In embodiments, outer CFH 510 may have a length of 2 bytes. In other embodiments, few or more than 2 bytes may be used. Inner CFH 522 may have a length selected considering a generation length g of the packet, frame, stream, etc. that is used to generate the outer CFH header. Inner CFH 522 may include information about the network coding scheme mentioned above. For example, inner CFH 522 may include information such as coding coefficients, or other information that can be used to perform decoding. It should be appreciated that in the case of sliding window, there is no need for the receiver to explicitly distinguish between FEC and normal packets.

Payload 524 may include the data to be received by the receiver. In an embodiment, the length of payload 524 may be the length of a QUIC payload less the length of outer CFH 520 and/or inner CFH 522.

Figure 6:
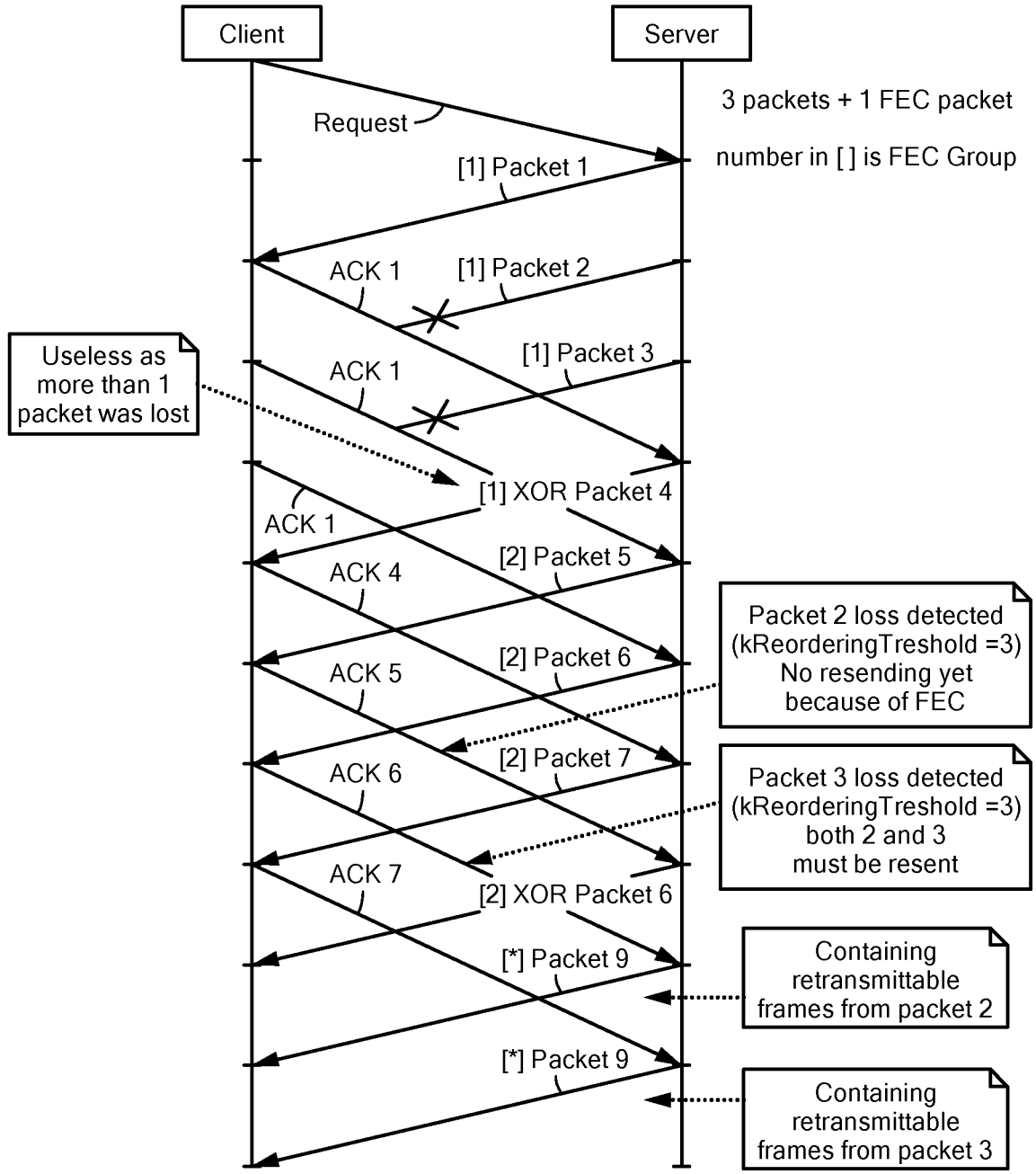
FIG. 6 is a sequence illustrating an example of a packet flow between servers and clients in accordance with a prior art FEC XOR.
Figure 6A:
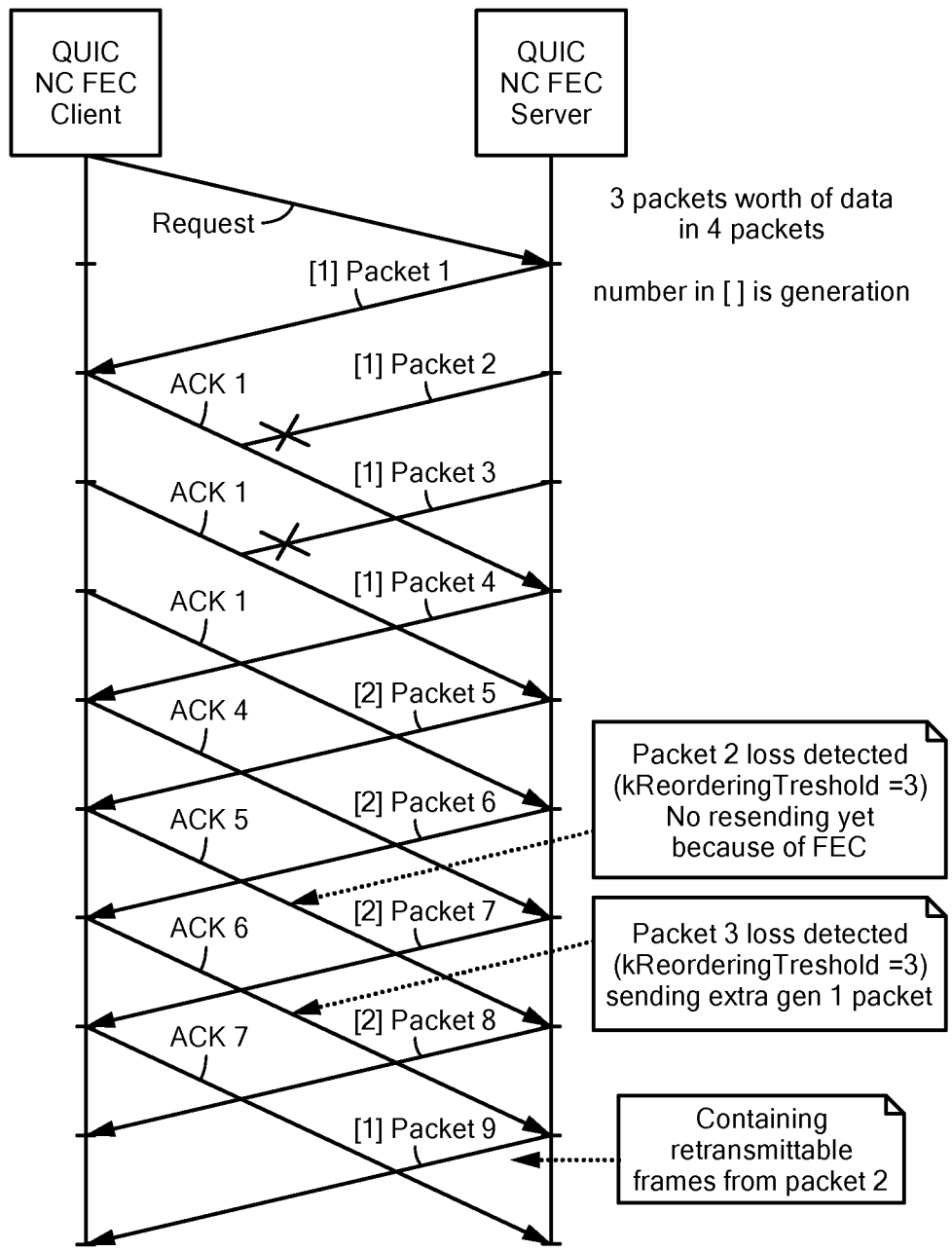
FIG. 6A is a sequence illustrating an example of a packet flow between servers and clients in accordance with a QUIC network coding (NC) FEC protocol.

FIGS. 6 and 6A are examples of packet flows between clients and servers which illustrate the difference between XOR and NC-based FEC. FIGS. 6 and 6A illustrate how utilizing network coding techniques improve the transfer of packets in the case where multiple packet loss occurs in the same FEC group (possibly considered a worst-case scenario of the prior art approach).

Turning now to FIG. 6, a sequence illustrating an example of a packet flow between servers and clients in accordance with a one aspect of a prior art QUIC FEC protocol is shown.

Referring now to FIG. 6A, a sequence illustrating an example of a packet flow between servers and clients in accordance with one aspect of a network coding (NC) based QUIC protocol is shown. As can be seen from a comparison of FIGS. 6 and 6A using the techniques described herein (i.e. the techniques of FIGS. 3 and 4), the transfer finishes faster than the prior art approach.

In accordance with the concepts, systems and techniques describe herein, however, by transmitting network coded packet using a larger field size and multiple equations then it is possible to recover the desired information even when multiple packets are lost.

Figure 7:
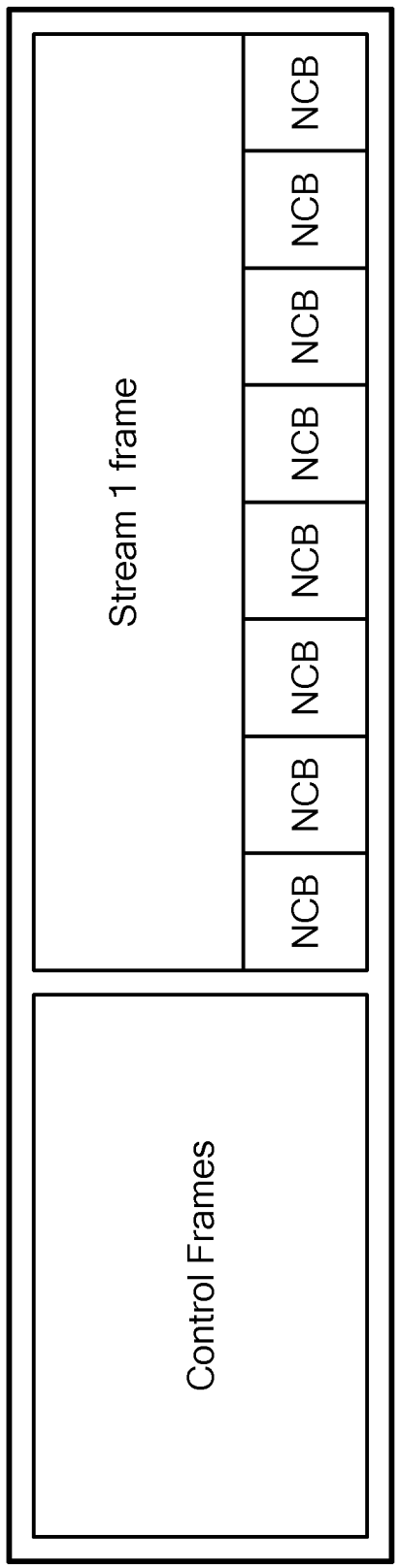
FIG. 7 is a diagram of a packet for stream level network coded (NC) FEC in which the data is partitioned into equal sized blocks and packed into a frame with a single stream frame being shown.

Referring now to FIG. 7, an example packet for stream level FEC (i.e. an illustration of stream level encoding) includes one or more control frames and a stream frame (Stream 1 frame). Stream frames are generated from streams. As illustrated in FIG. 7, stream 1 frame includes network coded data partitioned into equal sized blocks and packed into the stream frame. It should, of course, be appreciated that it is not necessary to use equal size NC blocks. Rather, variable size NC blocks may be used.

The control frames may include information, such as FEC packets and/or network coding coefficients, that can be used to recover lost packets from Stream 1. In this example, the control frames may be associated with a single stream.

Figure 7A:
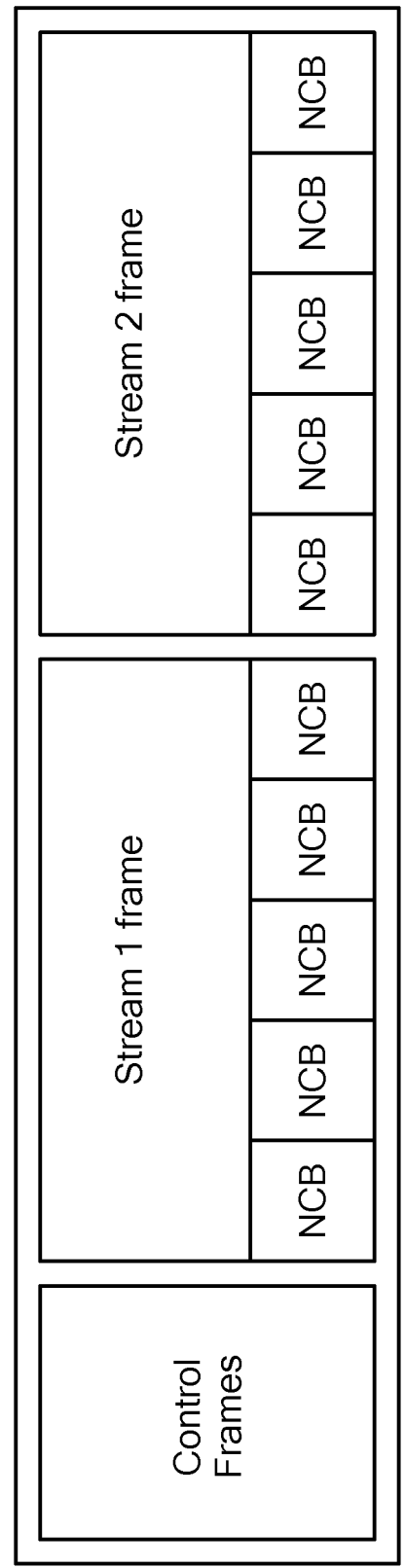
FIG. 7A is a diagram of a packet for stream level NC FEC in which the data is partitioned into equal sized blocks and packed into frames with a pair of stream frame being shown.

Referring now to FIG. 7A, a packet for stream level FEC includes one or more control frames and a plurality of stream frames with two streams (Stream 1 and Stream 2) being shown in this example. Each stream frame comprises a plurality of network coded blocks. Thus, it is possible to code together a plurality of different streams (i.e. intraflow vs. simply interflow may be used).

In this illustrative embodiment, each stream frame comprises network coded blocks partitioned into equal sized blocks and packed into the stream frame. It should, of course, be appreciated that it is not necessary to use equal size NC blocks. Rather variable size NC blocks may be used.

The control frames may include information, such as FEC packets and/or network coding coefficients, that can be used to recover lost packets from Stream 1 and/or Stream 2. In this example, the FEC control frames may be associated with more than one stream. In an embodiment, the same FEC and network coding coefficients may be used to recover errors in multiple streams. In another embodiment, the FEC control frames block may have multiple sets of FEC and network encoding coefficients. Each set may be used to decode and recover errors in a respective stream.

Figure 8:
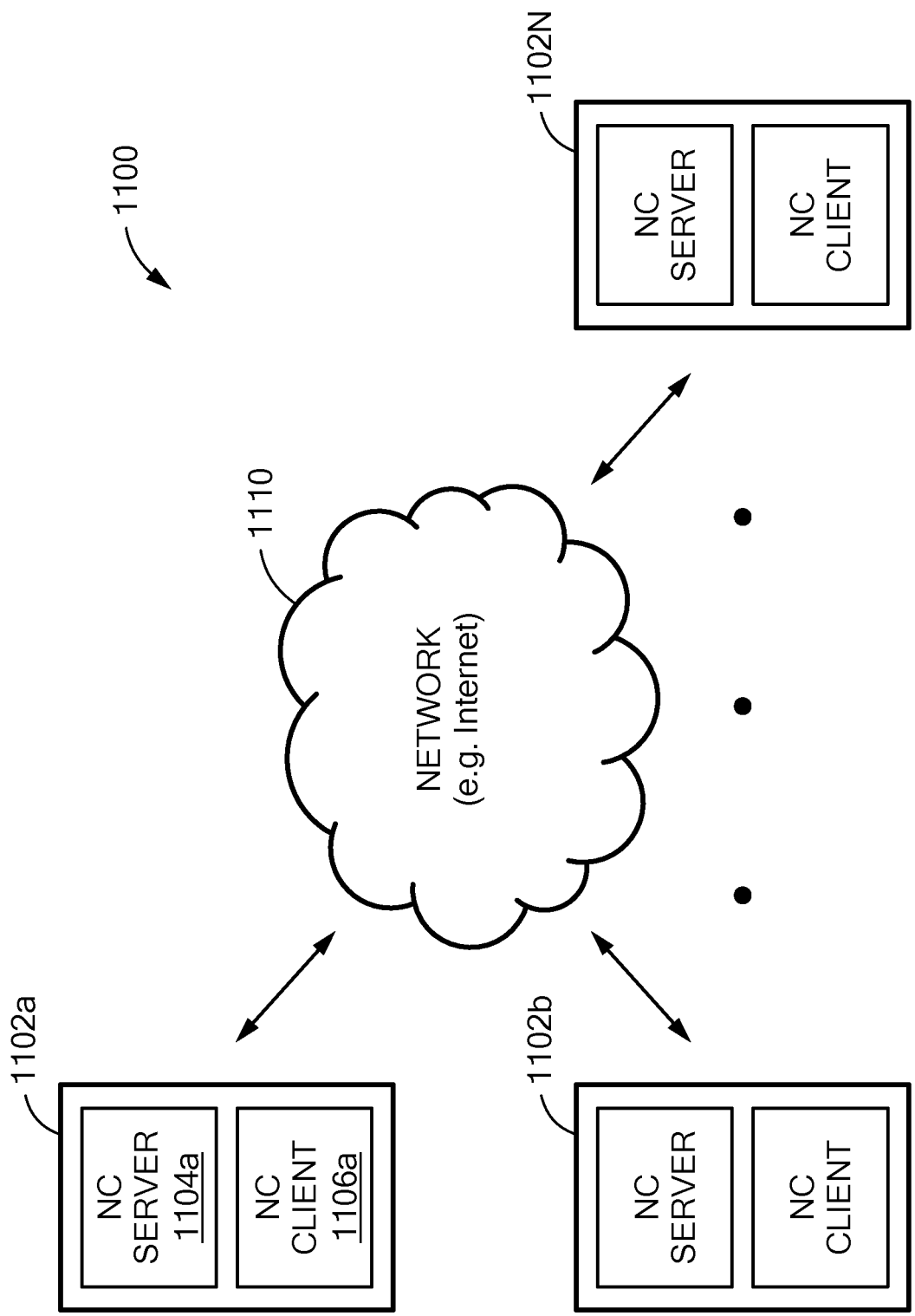
FIG. 8 is a block diagram of a communication system in accordance with an NC QUIC protocol.

Referring now to FIG. 8, a plurality of nodes 1102a-1102N are coupled through a network 1110. Taking node 1102a as representative of nodes 1102b-1102N, node 1102a includes an NC QUIC server 1104a and an NC QUIC client 1106a. Each of the nodes are capable of generating and receiving coded packets generated/received in accordance with either or a combination of the techniques described above in conjunction with FIGS. 3 and 4.

Having described preferred embodiments, which serve to illustrate various concepts, structures and techniques, which are the subject of this patent, it will now become apparent to those of ordinary skill in the art that other embodiments incorporating these concepts, structures and techniques may be used. Additionally, elements of different embodiments described herein may be combined to form other embodiments not specifically set forth above.

Accordingly, it is submitted that that scope of the patent should not be limited to the described embodiments but rather should be limited only by the spirit and scope of the following claims.

What is claimed is:

1. A method comprising:
   receiving a plurality of QUIC frames at an input;
   reframing the plurality of QUIC frames into a plurality of packed frames;
   adding the plurality of packed frames to a sliding window buffer;
   applying network coding to the plurality of packed frames within the sliding window buffer to generate encoded data;
   generating a coded frame comprising the encoded data and an outer coded frame header including information representing the coding coefficients used in the network coding;
   forming a User Datagram Protocol (UDP) packet comprising a public header and a representation of the coded frame;
   providing the UDP packet at an output for transmission to a receiver over a UDP connection;
   receiving an acknowledgement (ACK) that the UDP packet was received by the receiver; and
   in response to receiving the ACK, removing at least one of the packed frames from the sliding window buffer and adding at least one new packed frame to the sliding window buffer.

2. The method of claim 1 wherein the encoded data comprises an inner coded frame header including an original length portion representing lengths of the plurality of QUIC frames.

3. The method of claim 1 wherein the coded frame comprises new information to the receiver.

4. The method of claim 1 wherein the coded frame comprises forward error correction (FEC) data.

5. The method of claim 1 wherein the UDP packet comprises an encrypted representation of the coded frame.

6. The method of claim 1 wherein the information representing the coding coefficients used in the network coding comprises a vector of coding coefficients.

7. The method of claim 1, further comprising:
   providing information to a congestion control module in response to receiving acknowledgements, ACKs, from the receiver; and
   determining whether sending is allowed based on the information provided to the congestion control module.

8. The method of claim 1, further comprising padding one or more of the plurality of packed frames to a fixed size.

9. The method of claim 1, wherein applying network coding to the plurality of packed frames within the sliding window buffer includes applying network coding to packed frames from a single data stream.

10. The method of claim 1, wherein applying network coding to the plurality of packed frames within the sliding window buffer includes applying network coding to packed frames from two or more different single data streams.

11. A forward error correction (FEC) generator comprising:
   means for receiving a plurality of QUIC frames;
   reframing means for grouping the plurality of QUIC frames to provide a plurality of packed frames;

means for adding the plurality of packed frames to a sliding window buffer;
coding means for applying network coding to the plurality of packed frames within the sliding window buffer to generate encoded data;
means for generating a coded frame comprising the encoded data and an outer coded frame header including information representing the coding coefficients used in the network coding;
means for forming a User Datagram Protocol (UDP) packet comprising a public header and a representation of the coded frame;
an output at which the UDP packet is provided for transmission to a receiver over a UDP connection; and
means for receiving an acknowledgement (ACK) that the UDP packet was received by the receiver and, in response to receiving the ACK, removing at least one of the packed frames from the sliding window buffer and adding at least one new packed frame to the sliding window buffer.

12. The generator of claim 11 wherein the FEC generator is configured to operate with a window size greater than or equal to one.

13. The generator of claim 11 wherein the FEC generator is configured to operate with a window size greater than or equal to two.

14. The generator of claim 11 wherein the UDP packet comprises an encrypted representation of the coded frame.

15. The generator of claim 11 wherein the information representing the coding coefficients used in the network coding comprises a vector of coding coefficients.

16. The FEC generator of claim 11, further comprising means for padding one or more of the plurality of packed frames to a fixed size.

17. A system comprising:
a forward error correction (FEC) generator configured to:
  receive QUIC frames,
  reframe the QUIC frames into a plurality of packed frames,
  add the plurality of packed frames to a sliding window buffer;
  apply network coding to the plurality of packed frames within the sliding window buffer to generate encoded data,
  and generate a coded frame comprising the encoded data and an outer coded frame header including information representing the coding coefficients used in the network coding;
means for generating a UDP packet having a payload comprising a public header and a representation of the coded frame generated by said FEC generator; and
means for receiving an acknowledgement (ACK) that the UDP packet was received by the receiver and, in response to receiving the ACK, removing at least one of the packed frames from the sliding window buffer and adding at least one new packed frame to the sliding window buffer.

18. The system of claim 17 wherein the FEC generator is configured to operate with a window size greater than or equal to one.

19. The system of claim 17 wherein the FEC generator is configured to operate with a window size greater than or equal to two.

20. The system of claim 17, wherein the FEC generator is further configured to pad one or more of the plurality of packed frames to a fixed size.

* * * * *